United States Patent
Gupta et al.

(10) Patent No.: US 11,210,430 B2
(45) Date of Patent: Dec. 28, 2021

(54) SYSTEM AND METHOD TO NEGOTIATE ENCRYPTION RESPONSIBILITIES BETWEEN AN ENCRYPTION CAPABLE CONTROLLER AND A SELF ENCRYPTING DRIVE

(71) Applicant: DELL PRODUCTS, LP, Round Rock, TX (US)

(72) Inventors: Chitrak Gupta, Bangalore (IN); Rama R. Bisa, Bangalore (IN); Manjunath Vishwanath, Bangalore (IN); Chandrashekar Nelogal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 16/372,670

(22) Filed: Apr. 2, 2019

(65) Prior Publication Data

US 2020/0320226 A1      Oct. 8, 2020

(51) Int. Cl.
*G06F 21/78*     (2013.01)
*G06F 21/60*     (2013.01)
*G06F 21/62*     (2013.01)

(52) U.S. Cl.
CPC ............ *G06F 21/78* (2013.01); *G06F 21/602* (2013.01); *G06F 21/6218* (2013.01)

(58) Field of Classification Search
CPC ..... G06F 21/78; G06F 21/6218; G06F 21/602
USPC ........................................................ 713/193
See application file for complete search history.

(56) References Cited

U.S. PATENT DOCUMENTS

| | | | |
|---|---|---|---|
| 7,231,046 B1* | 6/2007 | Einola | H04L 63/0457 380/270 |
| 7,404,088 B2 | 7/2008 | Giobbi | |
| 7,899,189 B2* | 3/2011 | Dawson | H04L 63/0428 380/284 |
| 7,904,734 B1 | 3/2011 | Singla et al. | |
| 8,832,647 B2 | 9/2014 | Cope et al. | |
| 9,026,803 B2* | 5/2015 | Ali | G06F 9/44505 713/189 |
| 9,369,274 B2* | 6/2016 | Arnold | H04L 9/0618 |
| 9,652,216 B2 | 5/2017 | Dharmadhikari et al. | |
| 9,888,037 B1* | 2/2018 | Sharifi Mehr | H04L 63/205 |
| 9,940,143 B2 | 4/2018 | Kumar et al. | |
| 2004/0136533 A1* | 7/2004 | Takagaki | H04L 9/0891 380/255 |
| 2006/0143505 A1 | 6/2006 | Olarig et al. | |
| 2008/0137845 A1* | 6/2008 | Wood | H04L 63/164 380/33 |
| 2009/0254572 A1* | 10/2009 | Redlich | G06Q 10/06 |

(Continued)

*Primary Examiner* — Tae K Kim
*Assistant Examiner* — Peiliang Pan
(74) *Attorney, Agent, or Firm* — Larson Newman, LLP

(57) ABSTRACT

A system includes a storage device having a first encryption protocol, and a controller having a second encryption protocol. A processor implements the first encryption protocol or the second encryption protocol based on a strength of each encryption protocol, a topology of the system, a federal information processing standard certification status, a virtualization support, a multi-key support, a multi-band support, and an enterprise key management server support. Storage transactions may be encrypted using the implemented encryption protocol.

20 Claims, 7 Drawing Sheets

(56) References Cited

U.S. PATENT DOCUMENTS

| | | | |
|---|---|---|---|
| 2013/0290708 A1* | 10/2013 | Diaz | H04L 63/08 |
| | | | 713/165 |
| 2014/0149740 A1* | 5/2014 | Sato | H04L 9/006 |
| | | | 713/158 |
| 2015/0326437 A1 | 11/2015 | Shrestha et al. | |
| 2017/0179978 A1* | 6/2017 | Kawamura | H03M 7/30 |
| 2017/0186058 A1 | 6/2017 | Hare et al. | |
| 2017/0344294 A1 | 11/2017 | Mishra et al. | |

* cited by examiner

600

| | Criteria 615 | Weights 625 | CBE 635 | DBE 645 | Total CBE 655 | Total DBE 665 |
|---|---|---|---|---|---|---|
| 620 | FIPS Certification | 10 | 1 | 0 | 10 | 0 |
| 630 | Cipher Strength | 8 | 0 | 1 | 0 | 8 |
| 640 | Performance | 5 | 0 | 1 | 0 | 5 |
| 650 | Virtualization Support | 4 | 0 | 1 | 0 | 4 |
| 660 | Multi-key Support | 4 | 0 | 1 | 0 | 4 |
| 670 | Multi-band Support | 3 | 1 | 0 | 3 | 0 |
| 680 | EKMS Support Availability | 2 | 1 | 1 | 2 | 2 |
| 690 / 695 | Common Criteria for Information Technology Security Evaluation Certification | 8 | 1 | 1 | 8 | 8 |
| 697 | User Override Attribute | 10 | 1 | 0 | 10 | 0 |
| | Total Score: | | | | 33 | 31 |

| Bit<br>Byte | 7 | 6 | 5 | 4 | 3 | 2 | 1 | 0 |
|---|---|---|---|---|---|---|---|---|
| 0 | Operation code to Get Supported Encryption Modes 725 ||||||||
| 1 | Logical Unit Number/Array Number/Encryption Band 730 |||||| Reserved 735 | EVPD 740 |
| 2 | Page Code 745 ||||||||
| 3 | Reserved 750 ||||||||
| 4 | Allocation Length 755 ||||||||
| 5 | Control 760 ||||||||

| Bit<br>Byte | 7 | 6 | 5 | 4 | 3 | 2 | 1 | 0 |
|---|---|---|---|---|---|---|---|---|
| 0 | Operation code to Set Encryption Mode 765 ||||||||
| 1 | Logical Unit Number/Array Number/Encryption Band 770 |||||| Reserved 775 | EVPD 780 |
| 2 | Page Code 785 ||||||||
| 3 | Reserved 790 ||||||||
| 4 | Allocation Length 795 ||||||||
| 5 | Control 797 ||||||||

*FIG. 7B*

SYSTEM AND METHOD TO NEGOTIATE ENCRYPTION RESPONSIBILITIES BETWEEN AN ENCRYPTION CAPABLE CONTROLLER AND A SELF ENCRYPTING DRIVE

FIELD OF THE DISCLOSURE

The present disclosure generally relates to information handling systems, and more particularly relates to a method to negotiate encryption responsibilities between an encryption capable controller and a self-encrypting drive.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system includes a storage device having a first encryption protocol, and a controller having a second encryption protocol. A processor may implement the first encryption protocol or the second encryption protocol based on a strength of each encryption protocol, a topology of the system, a federal information processing standard certification status, a virtualization support, a multi-key support, a multi-band support, and an enterprise key management server support. Storage transactions may be encrypted using the implemented encryption protocol.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 6 is an example of a table that shows a set of criteria with corresponding weight values and scores, according to an embodiment of the present disclosure;

FIG. 7A is an example of a table that shows a general format of a proposed command to get supported encryption protocols, according to an embodiment of the present disclosure; and FIG. 7B is an example of a table that shows a general format of a proposed command to set supported encryption protocols, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
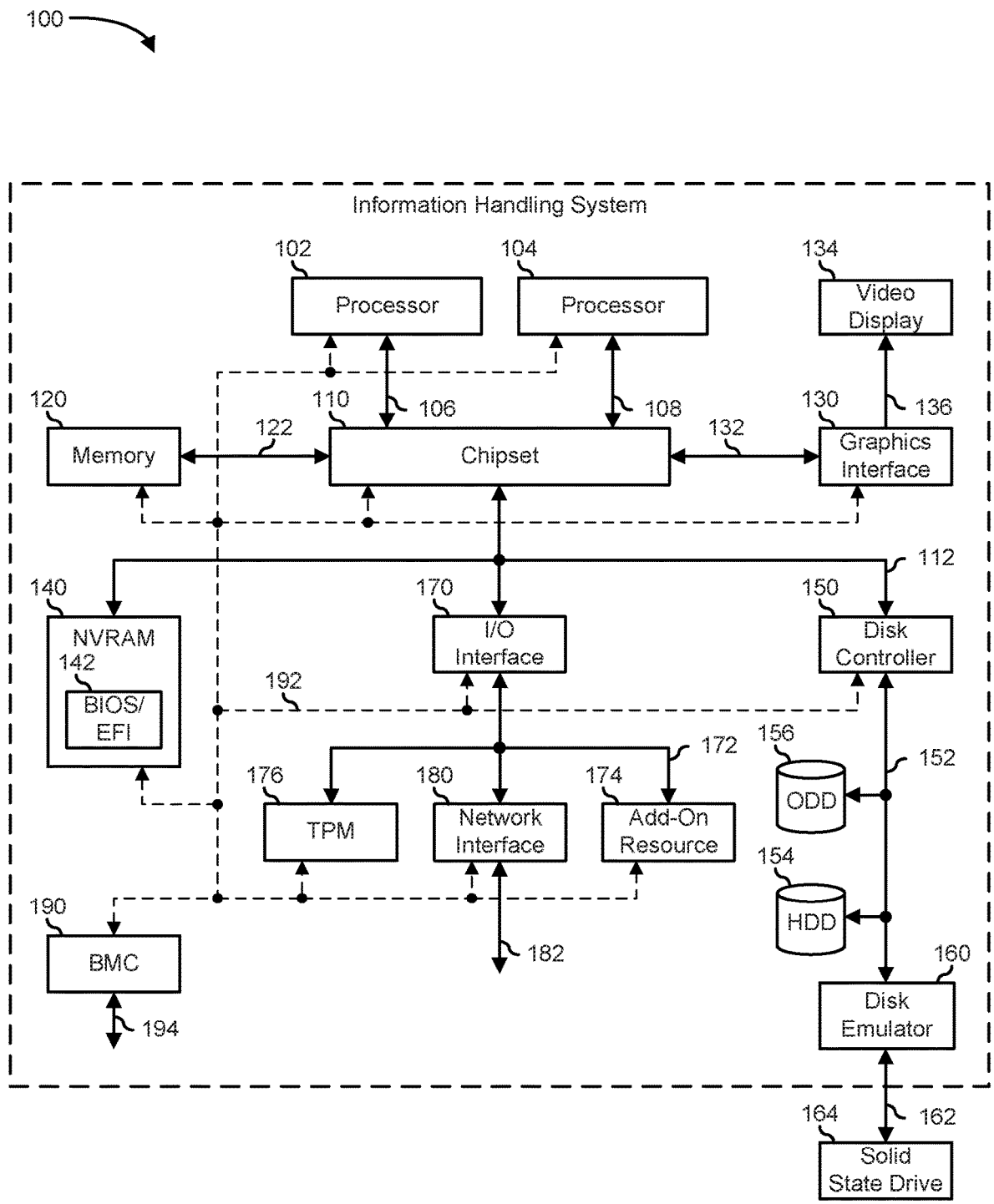
FIG. 1 is a block diagram of a general information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random-Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to an HDD 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits an SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices. In a particular embodiment, network interface 180 includes a NIC or a host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC) channel, a Bluetooth or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC) from Dell® is embedded within Dell Power-Edge™ servers and provides functionality that helps information technology (IT) administrators deploy, update, monitor and maintain servers.

Management interface 192 represents one or more out-of-band communication interfaces between BMC 190 and the elements of information handling system 100, and can include an I2C bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to the NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or the NV-RAM associated with the BMC. Information stored in the RAM may be lost after power-down of the power plane for BMC 190, while information stored in the NV-RAM may be saved through a power-down/power-up cycle of the power plane for the BMC.

Security measures for information handling systems, such as information handling system 100 have continued to increase in importance. One such security measure is data encryption. Encryption, which may be software-based or hardware-based, is a method of encoding information such that it can only be read using an encryption key. Software-based encryption may be performed by a processor at an application level. Hardware-based encryption includes drive-based encryption (DBE), controller-based encryption (CBE), switch-based encryption or the like. In DBE, a drive encrypts data before it is written to a storage medium and decrypts the data before it is read. In CBE, encryption occurs within a controller such as a SAS controller before the data is sent to a storage device. The CBE may utilize an application specific integrated circuit, a chip on the controller, or the like to perform the encryption.

To enable hardware-based encryption, a choice between different hardware-based encryption protocols may be determined. As used herein, encryption protocols may be referred to as encryption types or encryption modes. The choice may be negotiated based on a set of criteria that includes the strength of the available encryption algorithms, the performance of the devices, the number of storage drives, the number of encryption keys, etc.

Figure 2:
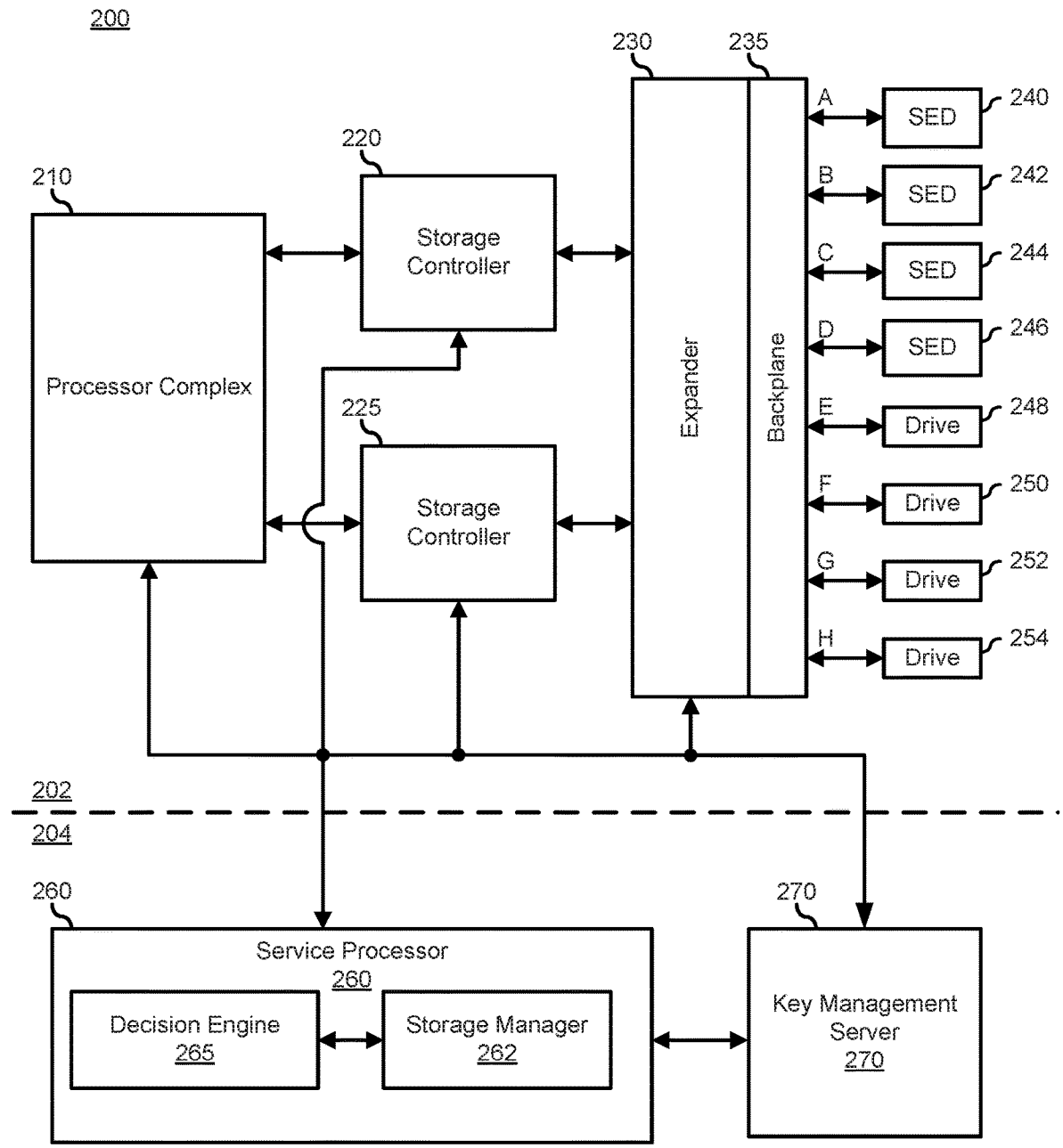
FIG. 2 is a block diagram of a computer system for encrypting data at rest, according to an embodiment of the present disclosure.

FIG. 2 shows an information handling system 200 similar to information handling system 100. Information handling system 200 is a computer system that may be used for encrypting data at rest. Data at rest encryption is a process of encrypting data that is not moving and protecting the data against unauthorized access. Information handling system 200 includes a host environment 202 and a management environment 204. Host environment 202 includes a processor complex 210, controllers 220 and 225, an expander 230, a backplane 235, storage devices or drives 240, 242, 244, 246, 248, 250, and 252, and one or more additional storage drives 254. Management environment 204 includes a service processor 260 and a key management server 270. The service processor 260 includes a storage manager 262 and a decision engine 265. Host environment 202 operates to provide data processing functionality of information handling system 200, such as is typically associated with an information handling system. As such, processor complex 210 represents a data processing apparatus, such as one or more central processing units (CPUs) or processor cores, and the associated data I/O functionality, such as a chipset component or another I/O processor component. Processor complex 210 operates to execute machine-executable code to perform the data processing tasks associated with information handling system 200.

Controllers 220 and 225 operate to manage one or more of storage drives 240, 242, 244, 246, 248, 250, 252, and 254, by providing mappings of the physical storage media of the storage drives to logical units that can be accessed by processor complex 210. As such, controllers 220 and 225 receive data storage transactions from processor complex 210 that are addressed to the various logical units, and the storage controllers execute the data storage transactions on the associated physical storage media of storage drives 240, 242, 244, 246, 248, 250, 252, and 254. Controllers 220 and 225 may implement a scheme for providing a redundant array of independent drives (RAID) functionality across one or more of the associated storage drives 240, 242, 244, 246, 248, 250, 252, and 254. Here, controllers 220 and 225 may map a single logical unit to a RAID array that includes multiple storage drives. Further, controllers 220 and 225 may partition one or more of storage drives 240, 242, 244, 246, 248, 250, 252, and 254 into multiple logical units. However, for the sake of simplicity, information handling system 200 is illustrated such that storage drive 240 is mapped as a logical "A" drive, storage drive 242 is mapped as a logical "B" drive, storage drive 244 is mapped as a logical "C" drive, storage drive 246 is mapped as a logical "D" drive, storage drive 248 is mapped as a logical "E"

drive, storage drive 250 is mapped as a logical "F" drive, storage drive 252 is mapped as a logical "G" drive, and storage drive 254 is mapped as a logical "H" drive.

Controllers 220 and 225 are each connected to processor complex 210 via a high-bandwidth communication interface, such as a four-lane (×4) PCIe link, an eight-lane (×8) PCIe link, a sixteen-lane (×16) PCIe link, or another high-bandwidth communication interface. Controllers 220 and 225 each operate in accordance with a particular storage fabric that is compatible with expander 230, backplane 235, and storage drives 240, 242, 244, 246, 248, 250, 252, and 254. An example of a storage fabric includes a Serial Attached SCSI (SAS) fabric, a SATA fabric, a Fibre Channel fabric, a PCIe fabric, or another storage fabric, as needed or desired.

Expander 230 operates to increase the number of physical storage drives that can be connected to each of controllers 220 and 225. For example, in a typical configuration, the controller may provide a native capacity to control no more than eight storage drives, while an expander may provide a fan-out such that up to 128 storage drives may be attached and controlled by a single storage controller. Here, expander 230 is connected to both of controllers 220 and 225 which operates to permit the controllers to control a greater number of storage drives. Further, expander 230 operates to map controllers 220 and 225 to their respective storage drives 240, 242, 244, 246, 248, 250, 252, and 254. Note that, as illustrated, information handling system 200 includes eight storage drives 240, 242, 244, 246, 248, 250, 252, and 254, but it will be understood that the eight storage drives may be representative of a greater or a lesser number of storage drives, as needed or desired.

Backplane 235 represents an electromechanical element of information handling system 200 that provides for the electrical connectivity to storage drives 240, 242, 244, 246, 248, 250, 252, and 254. In particular, storage drives 240, 242, 244, 246, 248, 250, 252, and 254 are typically removable elements of information handling system 200 that are configured to plug into separate receptacles in a chassis of the information handling system. Each receptacle may typically include power connections to power storage drives 240, 242, 244, 246, 248, 250, 252, and 254, and data connections that are configured in backplane 235 to connect to a particular port of expander 230. As such, each one of storage drives 240, 242, 244, 246, 248, 250, 252, and 254 are uniquely mapped to one of the ports of expander 230. In a particular embodiment, backplane 235 also provides a mechanical attachment mechanism for securing each of storage drives 240, 242, 244, 246, 248, 250, 252, and 254 to the chassis of information handling system 200.

Storage drives 240, 242, 244, 246, 248, 250, 252, and 254 represent various data storage devices that each are provided with a data interface that operates in accordance with the fabric implemented by controllers 220 and 225, expander 230, and backplane 235. For example, storage drives 240, 242, 244, 246, 248, 250, 252, and 254 can operate in accordance with the SAS fabric, the SATA fabric, the Fibre Channel fabric, the PCIe fabric, or another storage fabric, as needed or desired. Storage drives 240, 242, 244, 246, 248, 250, 252, and 254 can represent a common storage drive configuration or can represent various combinations of different storage drive configurations. For example, one or more of storage drives 240, 242, 244, 246, 248, 250, 252, and 254 may represent hard disk drives, tape drives, solid state drives, or other storage devices as needed or desired. As noted above, for the purpose of this disclosure, storage drives 240, 242, 244, 246, 248, 250, 252, and 254 are each represented on information handling system 200 as respective logical units A-H, but this is not necessarily so.

In this example, storage drives 240, 242, 244, and 246 are self-encrypting drives (SEDs). Storage drives 248, 250, 252, and 254 are non-SEDs. An SED is a storage device with circuitry built into the disk drive controller chip that encrypts data before it is written to the storage device and decrypts the data as it is read. The SED may be based on Trusted Computing Group (TCG) specifications that enable encryption and access control within the storage device. Each SED may have two types of keys: an encryption key and an authentication keys. Encryption keys are not ordinarily exposed to components outside the storage device and may require no administration. However, authentication keys may need some degree of system-level management support. For example, with respect to PCIe SSDs, a key identifier and a passcode may be used as a pair per security processor. The pair may be escrowed into a file and securely placed on the security processor's or storage manager's non-volatile memory. The pair may be managed using a non-volatile memory (NVMe) local key management (LKM) feature which supports the creation, deletion, change, importing, etc. of SED configuration features. The pair may also be stored and managed by an external key management server or enterprise key management server (EKMS) such as key management server 270.

SED encryption algorithm may be based on a National Institute of Standards and Technology (NIST) Federal Information Processing Standard (FIPS) 197 Advanced Encryption Standard (AES) such as AES-128 or AES-256. The AES algorithm is a symmetric key algorithm which uses the same key for encrypting/decrypting the data on the disk drive. The numbers refer to the bit-size of the encryption key used by the algorithm which may be a 128-bit (16 bytes) or 256-bit (32 bytes) random number. An SED may be implemented with RAID controllers and servers in a data center. The SED may also be implemented in portable computers such as a laptop.

Data storage and retrieval operations are managed in information handling system 200 under a system BIOS/EFI, and under an operating system based upon the logical units A-H. Thus, in order to successfully direct data storage and retrieval transactions to the correct logical unit, the system BIOS/EFI retains a mapping of which logical units are managed by which controllers. Further, controllers 220 and 225 retain mapping information for which logical units, and by extension which of storage drives 240, 242, 244, 246, 248, 250, 252, and 254, are managed by each storage controller. Finally, expander 230 implements the mapping between controllers 220 and 225 and storage drives 240, 242, 244, 246, 248, 250, 252, and 254 by correctly routing transactions from the storage controllers to the mapped storage drives.

Typically, the mapping information that is implemented by processor complex 210, by controllers 220 and 225, and by expander 230 is determined by the system BIOS/EFI based upon various settings and configurations that are predetermined during a system boot process. In a particular embodiment, information handling system 100 is configured to provide one of several predetermined mappings. For example, a first predetermined mapping may map logical units equally between controllers 220 and 225. Here, logical units A-D may be mapped to controller 220 and expander 230 may be configured to route storage and retrieval transactions from controller 220 to storage drives 240, 242, 244, and 246. Here further, logical units E-H may be mapped to controller 225 and expander 230 may be configured to route storage and retrieval transactions from controller 225 to storage drives 248, 250, 252, and 254. Other examples may include a second predetermined mapping that maps logical units A and B to controller 220 and that maps logical units C-H to controller 225, a third predetermined mapping that maps logical units A-F to controller 220 and that maps logical units G and H to controller 225, or other predetermined mappings, as needed or desired. In another embodiment, the mapping may also be configurable by a customer or a user.

Management environment 204 operates to implement and manage various maintenance, operation, and system update processes for information handling system 200 that are not typically associated with the data processing functionality of the information handling system. For example, management environment 204 may provide for out-of-band management of the various code executed on host environment 202, such as BIOS code or EFI code, firmware code, programs, applications, operating systems, and the like. In particular, management environment 204 can operate on a different power plane than host environment 202, such that the management environment can download, and store updated code for the host environment, even when the host environment is powered off. Management environment 204 also operates to monitor and maintain the functions and features of information handling system 200 that are not necessarily associated with the data processing operations performed by host environment 202, such as system thermal and cooling management, fan speed adjustment, power supply monitoring and adjustment, and the like. As such, management environment 204 represents one or more elements that provide a co-service processor of information handling system 200 that performs the update, monitoring, and maintenance functions of the management environment. Service processor 260 may be a BMC and represents the main service processor of management environment 204. The service processor 260 may be connected to one or more I/O devices such as, for example, a display or other output device, and an input device such as for example, a keyboard, mouse and the like.

Processor complex 210, controllers 220 and 225, expander 230, service processor 260, storage devices 240-254, key management server 270 may communicate using standard interfaces and/or protocols such as SATA and/or Opal interface. Also, processor complex 210, controllers 220 and 225, expander 230, and service processor 260 each may include an I2C interface (not shown). The I2C interface may represent one or more multi-master/multi-slave serial communication busses that provide relatively low speed, between 100 kilobits per second (kbits/s) and 1 megabits per second (mbits/s) or more, data communications between processor complex 210, controllers 220 and 225, expander 230, and service processor 260. The I2C interfaces are typically utilized to pass various management information between the elements of information handling system 200 that is utilized by service processor 260 to perform the various update, monitoring, and maintenance functions of management environment 204. Service processor 260 may include a network interface (not shown), that permits management environment 204 to connect to a management system external to information handling system 200 to receive update and maintenance information from the management system, and to provide monitoring information to the management system. The mechanisms and method of system management via a service processor such as service processor 260 are known in the art and are beyond the scope of the present disclosure, and will not be further elaborated upon herein, except as needed to elaborate the present disclosure.

Storage manager 262 may be configured to determine the encryption mode to be used in encrypting data. Storage manager 262 may include a local or an external key management service such as key management server 270 that stores, manages, and serves authentication and/or encryption keys. Storage manager 262 may be implemented in any suitable manner. For example, storage manager 262 may be implemented by code, instructions, libraries, shared libraries, software-as-a-service, functions, applications, scripts, or executables. Although storage manager 262 is illustrated as a single element, storage manager 262 may be implemented through a combination of elements. For example, in one embodiment, storage manager 262 may be also be distributed in host environment 202 such as located in processor complex 210. Storage manager 262 may also be accessible via a user interface, a command line, etc.

In a particular embodiment, storage manager 262 may detect provisioning of information handling system 200. Storage manager 262 may also detect abnormalities during or after provisioning and proceed to re-provision the information handling system. During provisioning, an administrator may determine whether to secure data. Securing data may also be determined and activated automatically via rules and/or policies. Securing data may be performed by activating encryption. Activating encryption allows an environment such as information handling system 200 to securely store data at rest. The administrator may also determine an encryption mode when activating encryption.

Decision engine 265 may be configured to determine the encryption mode. In determining the encryption mode, it is important to choose the most suitable and/or strongest encryption mode. Encryption modes may include software-based encryption or hardware-based encryption. Hardware-based encryption includes the DBE, the CBE, a mix of both the DBE and the CBE, switch-based encryption, or the like. In determining the encryption mode to use for the information handling system 200, decision engine 265 may use a negotiation protocol. The negotiation protocol may be a set of policies and/or rules to determine the encryption mode. The policies and/or rules may include a set of criteria. The set of criteria may be determined based on certain factors, heuristics or chosen by the administrator. Each criterion in the set may be assigned a weight value. The assigned weight value may be relative to another criterion in the set. The weight value may be assigned to a criterion based on the criterion's importance. The weight values may also depend on one or more factors, such as geographical location, the speed of communication medium, and the like.

In a particular embodiment, the CBE encryption mode may be chosen when all of the controllers, such as controllers 220 and 225 are encryption capable. In CBE, a unique encryption key is generated for each storage device and is used to encrypt data as it is sent to the storage device. The encryption key may be a 128-bit or a 256-bit randomly generated key. A second key is generated to wrap the encryption key when the encryption key is generated. The second key may be a 256-bit randomly generated key. Various encryption algorithms such as the AES may be used in generating the encryption key and the second key such as using the AES or Rivest, Shamir, and Adleman (RSA) algorithms. The DBE encryption mode may be disabled after the CBE encryption mode has been chosen.

In another embodiment, the DBE may be chosen when all of the storage devices are SEDs. In the DBE, a unique encryption key may be generated and used to encrypt the data before it is written to the storage device. The encryption key may be a randomly generated 128-bit or 256-bit key. A second key may also be generated to encrypt the encryption key before being stored in the storage device. The second key may be a 256-bit randomly generated key. Similar to above, various encryption algorithms may be used in generating the encryption key and the second key. The CBE encryption mode may be disabled after the DBE encryption mode has been chosen.

In yet another embodiment, a mixed mode encryption such as both the DBE and the CBE may be used to encrypt data may be chosen in some situations such as when at least one or more controller is encryption capable and/or one or more storage device is an SED. When the mixed mode encryption is chosen, the encryption method of a particular data may depend on the location where the particular data may be stored. The CBE may be selected for data stored in a non-encryption capable drive or non-SED which is mapped to an encryption capable controller. For example, the CBE may be used for encrypting data stored in storage drives 240, 242, 244, and 246. The DBE may be selected for the data stored in an SED that is mapped to a non-encryption capable controller. For example, the DBE may be used for encrypting data stored in storage drives 248, 250, 252, and 254. Software-based encryption may be chosen when information handling does not have an SED or an encryption-capable controller. In yet another embodiment, a different hardware device that is encryption capable such as a switch may be selected.

Selection of the encryption mode may be performed manually via a user interface. The selection may also be automated such as via the use of policies, rules, and/or machine learning algorithms. The selection may be performed during the initial provisioning or re-provisioning of the information handling system. After the initial provisioning, the administrator may learn new facts and insights regarding the selection process. Consequently, the administrator may make changes to the current selection process such as update the rules and/or algorithm and may then re-provision. Further, the administrator may also adjust the assigned weights and/or add a criterion to the selection of the encryption mode. In addition, the administrator may add, delete, and/or update the set of criteria for selecting the encryption mode. Finally, the administrator may manually select a different encryption mode. The administrator may perform the changes or updates after provisioning without re-provisioning the information handling system.

Key management server 270 may be configured to generate and store a set of encryption keys. In response to a received encryption key request, the key management server 270 may provide one or more stored encryption keys. In an embodiment, the encryption key request may include an information identifying a storage device, a set of logical blocks of a storage device, a controller, or the like. Based on the identifier, the key management server 270 may select one or more of the encryption keys and communicate the selected keys. The encryption key may be stored in an encryption key store. The encryption key store may be made up of or include a database, having a number of database records, where each database record corresponds to and is associated with a single individual data object. The encryption key may be used to perform symmetric key encryption, in which the same key may be used for both encryption and decryption. In other embodiments, the encryption key may be used to perform asymmetric-key encryption, in which different keys are used for encryption and decryption, and in which both an encryption key and different decryption may be stored for a data object in a corresponding record of encryption key store.

Key management server 270 may be configured to generate and store a set of authentication keys instead of or in addition to the encryption keys. In response to a received authentication key request, the key management server 270 may provide one or more stored authentication keys. In an embodiment, the authentication key request includes identification information indicating a storage device, a set of logical blocks of a storage device, a controller, or the like. Based on the identification information, the key management server 270 may select one or more of the authentication keys and use the selected keys to decrypt the encryption keys and gain access into the SEDs.

Figure 3:
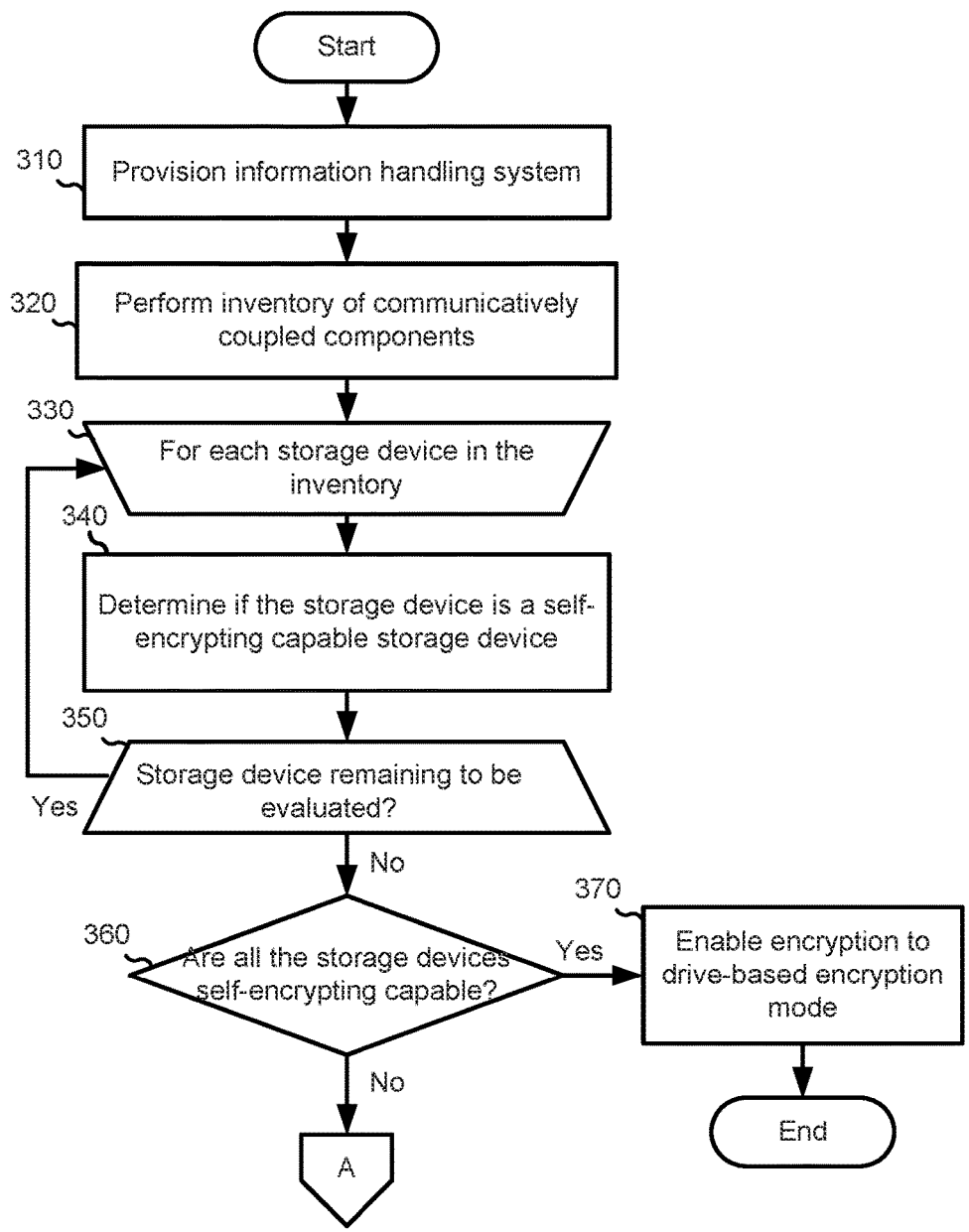
FIG. 3 is a flow diagram of a method for a negotiation protocol, according to an embodiment of the present disclosure.

FIG. 3 shows a negotiation protocol that determines which encryption protocol may be used by the information handling system for encrypting data at rest. The method may be performed by the service processor, the storage manager, the decision engine, the processor complex, or the like. The negotiation protocol may be included in policies or rules for automated deployment of encryption schemes. The deployment of encryption schemes or modes may be included during a provisioning process. The policies may be determined programmatically or manually by the administrator. For example, the policies may be determined heuristically by machine learning. At block 310, the information handling system may be provisioned. The provisioning process may include implementing or enabling encryption and setting or selecting the encryption mode. Provisioning may also include determining a set of criteria for selecting the encryption mode. The provisioning and/or portions thereof may be performed automatically or manually via a user interface. The user interface may be available through a web browser which may be communicatively coupled to the service processor, the storage manager, the decision engine, the processor complex, or the like. The method proceeds to block 320.

At block 320, the method may perform an automated discovery of various components and/or devices of the information handling system such as controllers, backplanes, and storage devices. The automated discovery may be performed using SAS discovery service, for example. The automated discovery may include querying various devices to identify information, attributes, configuration, capabilities and/or properties of each device. For example, the automated discovery may determine identifiers and/or service names of the devices, block sizes of the storage devices, location of the devices, whether the device is a virtual device, whether the device supports virtualization, whether the device is FIPS certified, whether the devices are encryption capable, etc. An inventory list of the various discovered components and/or devices may be generated. The inventory may include the some or all of the determined information about each of the discovered components and/or devices. The inventory list may be arranged according a set preference such as according to each device's GUID, category, encryption-capability, etc. There may be a different inventory list for each of the categories of devices. For example, there may be a separate inventory list for storage devices, controllers, backplanes, etc.

The various devices may also advertise their presence and capabilities using service location protocol (SLP). SLP is a service discovery protocol that allows for a computer system to find services in a local area network. The devices may include an SLP service agent to announce services such as to an SLP directory agent. A management client such as the service processor may query the SLP directory agent. Each device may be identified by a unique identifier such as a globally unique identifier (GUID). The inventory list may be generated and/or updated based on the announced services.

The inventory may include determining supported encryption modes. The service processor may initiate a command such as a get supported encryption modes command to determine the supported encryption modes of the information handling system. The get supported encryption modes command is discussed in detail in FIG. 7A. After performing an inventory of the various devices, the method proceeds to block 330.

At block 330, the inventoried storage devices in the inventory list are evaluated. The storage device being evaluated may be referred to as the selected storage device. The inventory list can be traversed as structured or rearranged depending upon various factors. The rearrangement may be based on order of identifying information, the category of the device, etc. For example, the inventory list may be separated into categories such as controllers, storage devices, and backplanes. The method proceeds to block 340.

At block 340, the method determines if the selected storage device is an SED. If the selected storage device is an SED, the method may set a mark or flag to identify that the selected storage device is an SED. The method may determine if the selected storage device is an SED via the properties queried during the inventory of the selected storage device. In another embodiment, the method may query the selected storage device to determine if the selected storage device is encryption capable. The method proceeds to block 350.

At block 350, the method identifies if there is another storage device to be evaluated. If there is another storage device to be evaluated, the method proceeds with processing the next storage device in the inventory list. Otherwise, the method proceeds to block 360. At block 360, the method determines if all the storage devices in the inventory list are SEDs. Although CBE provides encryption to all storage devices, encrypting data at a common resource between all the storage devices may become a bottleneck to performance. Thus, the method may be programmed to select DBE if all of the storage devices are SEDs. If all of the storage devices are SEDs then the method proceeds to block 370. At block 370, the method sets the encryption mode to the DBE, then the method ends. Otherwise, the method proceeds to block 410 of FIG. 4.

Figure 4:
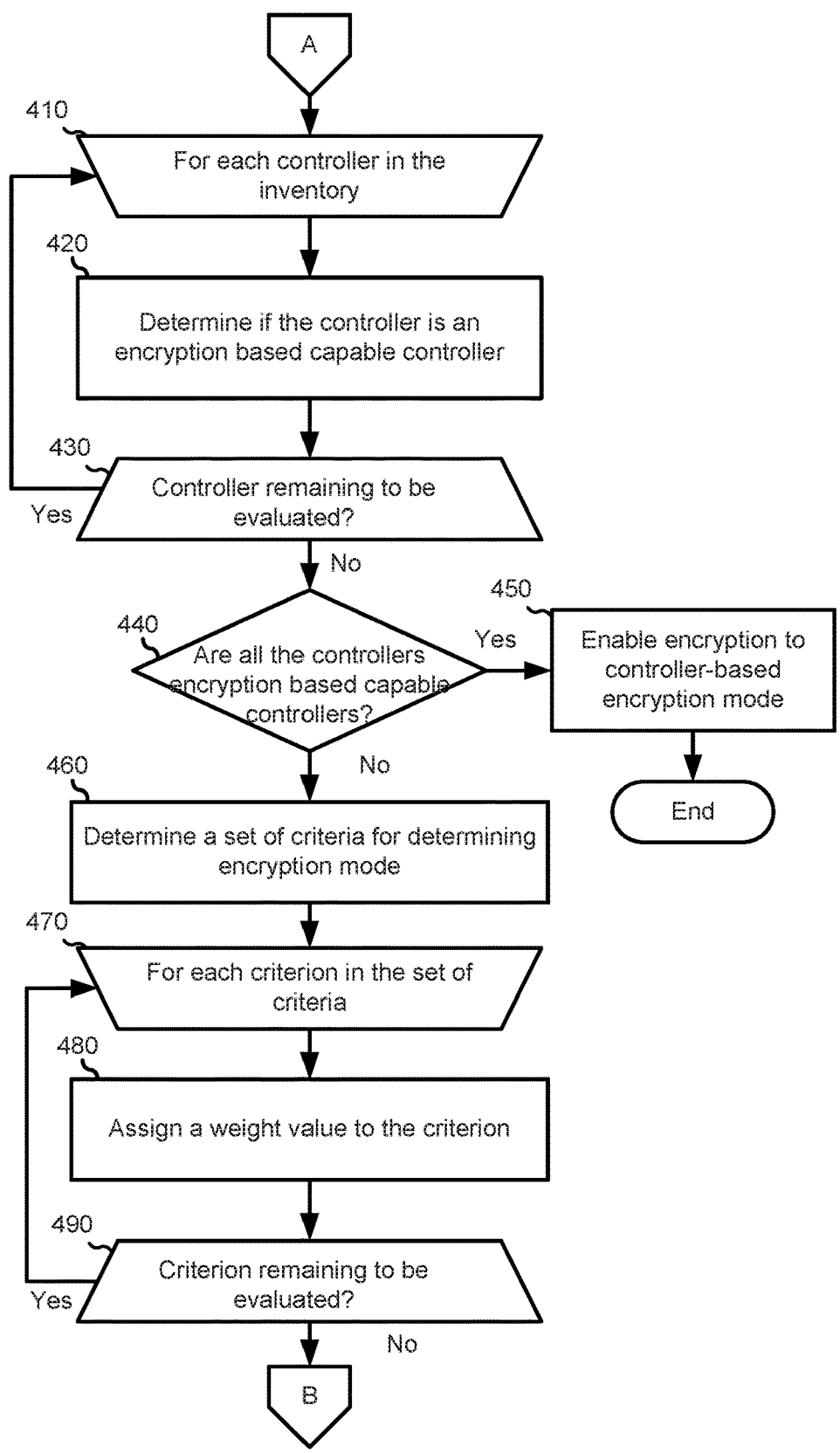
FIG. 4 is a continuation of the flow diagram of FIG. 3, according to an embodiment of the present disclosure.

FIG. 4 is a continuation of the flow diagram of FIG. 3. At block 410, the method begins to evaluate the inventoried controllers in the inventory list. The controller being evaluated may be referred to as a selected controller. At block 420, the method may determine if the selected controller is an encryption capable controller. The method may determine if the selected controller is encryption capable based on the properties queried during the inventory of the selected controller. In another embodiment, the method may query the selected controller to determine if the selected controller is encryption capable. If the selected controller is encryption capable, the method may set a mark or flag to identify that the selected controller is encryption capable. The method then proceeds to block 430.

At block 430, the method identifies if there is another controller to be evaluated. If there is another controller to be evaluated, the method proceeds with processing the next controller in the inventory list. Otherwise, the method proceeds to block 440. At block 440, the method determines if all the controllers in the inventory list are encryption capable controllers. If all the controllers are encryption capable controllers then the method proceeds to block 450. At block 450, the method sets the encryption mode to CBE, then the method ends. Otherwise, the method proceeds to block 460.

At block 460, the method may determine a set of criteria for selecting an encryption mode. The set of criteria may be determined by various factors such as security requirements of data, size of data, the capacity of the storage device, ease of securely encrypting the data, etc. The set of criteria may include the following: FIPS certification, strength of the encryption algorithm, performance of the controller and/or storage device, whether the encryption mode support virtualization, whether the encryption mode provide multi-key support, whether the encryption mode provide perform multi-band support, whether the encryption mode support an EKMS, whether the encryption mode provides support for security zones in virtualization environments using an EKMS solution that requires multiple keys per security zone, whether the encryption mode provides support for storage device migration, whether the topology includes external arrays or storage devices, ease of securely erasing stored data, and the like.

The set of criteria for selecting an encryption mode may be manually identified by the administrator. The administrator may use a graphical user interface, a command line interface, a configuration file, or the like to identify the set of criteria. The configuration file may be generated externally and downloaded to be accessible by the method. The configuration file may be of various formats such as an extensible markup language (XML) file, a JavaScript object notation (JSON) file format, or the like. The configuration file may include information that may be used to select the encryption mode such as a name of the encryption algorithm used by the controller and/or storage devices.

At block 470, the method begins to evaluate each criterion in the set of criteria. The criterion being processed may be referred to as a selected criterion. The set of criteria may be formatted as a list. The method can traverse the list of criteria as structured or rearrange the list. The rearrangement may be based on order of identifying information associated with each criterion, the weight value of the criterion, etc. The method may generate and use a table similar to the table in FIG. 6 when evaluating each criterion. At block 480, the method evaluates the selected criterion and assigns a weight value the selected criterion.

At block 480, each criterion may be assigned a weight value. A weighting methodology may be implemented to determine and assign a weight value to each criterion. The weighting methodology may vary but, in an example embodiment, includes providing various weight values based on levels or a ranking set by the administrator. The rank of the criterion may be relative to the other criteria in the set. For example, it may be determined that the strength of the encryption algorithm or cipher strength is more important than the performance of the encryption algorithm. The assigned weight value may be proportional to the importance or rank of the criterion. Accordingly, cipher strength may be assigned a higher weight value than the performance. The weight values may also be assigned manually by the administrator. The weight values may also be determined based on various factors or historical data, such as a location of the storage device, type of data, etc.

The weight values assigned to the criterion may be based on a scale. The administrator may assign a range in the scale, for example, one being least important to ten being the most important. The range may be determined by the administrator and be varied, for example, instead of one to ten, the range may be from one to 100. The range may also use other values such as from A to Z, with A being most important and Z being least important.

At block 490, the method identifies if there is another criterion remaining to be evaluated. If there is another criterion to be evaluated, the method proceeds with processing the next criterion in the list. Otherwise, the method proceeds to block 510 of FIG. 5.

Figure 5:
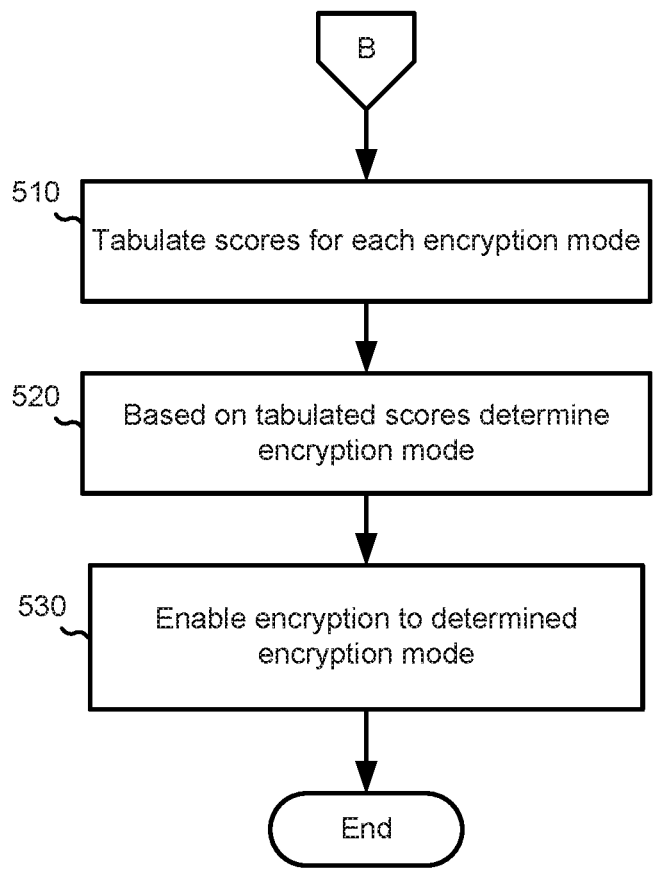
FIG. 5 is a continuation of the flow diagram of FIG. 4, according to an embodiment of the present disclosure.

FIG. 5 is a continuation of the flow diagram of FIG. 4. At block 510, the method tabulates the scores for each of the criterion and encryption mode under consideration. A score of 1 may be assigned if the encryption mode meets or satisfies the criterion. A score of 0 may be assigned if the encryption mode does not meet the criterion. The method tallies each of the scores to determine a total score for each of the encryption modes, wherein the total score is a summation of the score of each of the criterion. At block 520, the method determines the encryption mode based on the tabulated scores. The encryption mode with the highest total score may be selected. The method then proceeds to block 530, wherein the encryption is enabled for the information handling system and to use the selected encryption mode. The information handling system may be enabled to use the selected encryption mode via a command to set encryption mode. The command to set encryption mode is discussed in detail in FIG. 7B.

FIG. 6 is an example of a table 600 that shows a set of criteria with its corresponding weight values and scores for each encryption mode under evaluation. Table 600 provides information that can be used in determining which encryption mode to use. In this example, the tabulation resulted in a total score of 25 points for the CBE and 23 points for the DBE. Thus, the CBE may be selected as the encryption mode for the information handling system.

As shown in table 600, different columns are provided with information associated with the set of criteria such as the name of the column, weight values, encryption mode scores, etc. It should be noted that table 600 is an example of a table and that the information and values may be presented in different formats. Table 600 includes the following columns: criteria 615, weights 625, a CBE 635, a DBE 645, a total CBE 655, and a total DBE 665. Table 600 also includes the following rows: a header 610, a first criterion 620, a second criterion 630, a third criterion 640, a fourth criterion 650, a fifth criterion 660, a sixth criterion 670, a seventh criterion 680, an eighth criterion 690, a ninth circuit criterion 695, and a total score 697. Table 600 may be generated and presented to the administrator through a GUI by the decision engine or storage manager for example. Table 600 may be generated and presented during the provisioning of the information handling system. The administrator may also update the set of criteria through the GUI. For example, the administrator can add, edit, and/or delete a criterion, weight values of the criteria, or an encryption mode. Table 600 provides one example of a table that may be generated with example values shown for purposes of illustration. Other formats and values may be provided based on specific applications, environment, the set of criteria, the encryption modes, etc. The administrator can alter the columns, the criterion, the weights values, etc. Table 600 thus may be configurable by the administrator during provisioning. The administrator may also perform updates to table 600 and re-provision the information handling system. In another embodiment, the administrator may update the selected encryption mode to a different encryption mode and/or disable encryption.

Criteria 615 includes each criterion of the set of criteria, wherein each row is a criterion. Weights 625 lists a weight value respective to each criterion. As shown, a score of one may be assigned to one of the encryption modes that meet the criterion. The encryption mode that did not meet the criterion may be assigned a score of zero.

In this example, first criterion 620 is FIPS certification. The FIPS regulates cryptography and use of cryptographic libraries. A FIPS publication 140-2 is a U.S. government computer security standard that is used to approve cryptographic modules that include both hardware and software components and/or devices. To be certified FIPS compliant, a device may undergo a rigorous process that ensures the device meets the requirements defined by the FIPS such as the FIPS publication 140-2. For example, to obtain the FIPS certification of a self-encrypting hard disk drive, the self-encrypting hard disk drive's printed circuit board assembly (PCBA) and other components should be protected against tampering and unauthorized access to its security function related components. In this example, using a scale of one to ten, with ten being a weight value for the most important criterion and one being the least important criterion, the administrator may determine that FIPS certification is very important and assign a weight value of ten. In this example, the CBE is FIPS certified and a score of one is assigned as shown in CBE 635. Because the DBE is not FIPS certified, a score of zero is assigned to the DBE, as shown in DBE 645.

Eighth criterion 690 is a common criteria for information technology security evaluation certification (common criteria) attribute. Common criteria is an international standard providing a common set of requirements for the security and functionality of devices, system or network. The requirements may be used as guides for the development, evaluation, and/or certification of the devices. A number of organization and government agencies require the use of common criteria certified products and systems and use the common criteria in their purchase. Several countries such as Australia, Canada, Finland, France, United Kingdom, and the United States have signed a mutual recognition agreement so that devices certified in one country are recognized in another. In this example, the administrator may determine that common criteria certification is important and assign a weight value of eight. Further, the administrator may determine that the CBE and DBE are both common criteria certified and a score of one is assigned to each one as shown in CBE 635 and DBE 645.

Second criterion 630 is cipher strength. A cipher is an algorithm for encrypting and decrypting data. Cryptographic algorithms generally have two categories: symmetric key cryptographic algorithms and asymmetric key cryptographic algorithms. Asymmetric key cryptographic algorithms include the RSA, traditional discrete algorithm (TDL), pretty good privacy (PGP), secure shell (SSH), etc. Symmetric key cryptographic algorithms include the AES, Blowfish, data encryption standard (DES), Rivest Cipher 4 (RC4), etc. Each of the cryptographic algorithms has a different security strength which depends at least in part on the size of the encryption key. The cipher strength is generally described as the amount of work needed to break the cryptographic algorithm and is usually expressed in bits. For example, the AES-128 offers a 128-bit cipher strength which makes the AES-128 stronger than a 56-bit key of the DES. The administrator may determine that the cipher strength is important but not as important as the FIPS certification and assign a weight value of eight. In this example, because the DBE meets the cipher strength criterion, a score of one is assigned to the DBE as shown in DBE 645. Because the CBE does not meet the cipher strength criterion, a score of zero is assigned to CBE as shown in CBE 635.

Third criterion 640 is performance. Generally, SEDs may have 35,000 to 270,000 input/output operations (IOPS) depending on whether the SED is an HDD or an SSD for example. On the other hand, controllers may be capable of delivering 400,000 IOPS per channel. IOPS refers to the maximum number of reads and writes to non-contiguous storage locations. In this example, the administrator may determine that the performance is not as important as the cipher strength and assign it a weight value of five. Because the DBE meets the performance criterion, a score of one is assigned to the DBE as shown in DBE 645. Because the CBE does not meet the performance criterion, a score of zero is assigned to DBE as shown in CBE 635.

Fourth criterion 650 is virtualization support. The virtualization support criterion refers to the ability to incorporate the encryption mode to a virtualization environment. Since encryption with the SEDs is done within each storage device, the SEDs can easily be added or swapped for other SEDs. Also, because data stored in the SEDs can be erased and reused without concern regarding access to the original data, the SEDs may be moved from one client to another client in the virtualization environments. The administrator may determine that the virtualization support criterion is not as important as the performance criterion and assigns a weight value of four. In this example, the DBE meets the virtualization support criterion and is assigned a score of one as shown in DBE 645. Because the CBE does not meet the performance criterion, a score of zero is assigned as shown in CBE 635.

Fifth criterion 660 is multi-key support. Multi-key support as used herein refers to whether a device can use multiple authentication keys. For example, multiple authentication keys may be used during multi-factor authentication. The administrator may determine that the multi-key support criterion is as important as the virtualization criterion and assigns a weight value of four as shown in weights 625. In this example, the DBE meets the multi-key support criterion and assigned a score of one as shown in DBE 645. Because CBE does not meet the performance criterion, a score of zero is assigned as shown in CBE 635.

Sixth criterion 670 is multi-band support. Logical block addressing (LBA) is a common scheme used for specifying the location of blocks of data stored on a computer-readable medium. The LBA locates blocks by an index, with the first block being LBA=0, the second LBA=1, etc. A contiguous LBA range is called a band. Each band does not overlap and may be secured with an encryption key and an authentication key. In case of multi-tenancy, multiple virtual machines may use different encryption bands in a storage device. Each virtual machine may be mapped to use a separate band. Each band may use a separate authentication key. The administrator determines that the criterion multi-band support is less important than the criterion multi-key support and assigns a weight value of three as shown in weights 625. In this example, the CBE meets the criterion multi-band support and is assigned a score of one as shown in CBE 635. Because the DBE does not meet the criterion multi-band support, a score of zero is assigned as shown in DBE 645.

Seventh criterion 680 is EKMS support availability. The administrator may determine that the criterion EKMS support availability is less important than the criterion multi-band support and assigns a weight value of two. In this illustration, because both the CBE and the DBE meets the EKMS support availability criterion, a score of one each is assigned for the CBE and the DBE as shown in CBE 635 and DBE 645.

Eighth criterion 690 is a user override attribute. The user override attribute may be an additional criterion that the administrator may add to the set of criteria. For example, the administrator may add a device operating system type and transport capability as criteria in selecting the encryption mode. In another example, the added criterion may include whether the information handling system is a virtualization environment with multiple security zones requiring multiple encryption keys per zone that is managed by an EKMS. In this situation, the CBE may be more ideal because a plurality of security bands may be defined or implemented with the controller, in contrast to the DBE which usually support a single security band.

The CBE may also be preferred when ease of securely erasing stored data is an important criterion. The CBE may be preferred in this scenario because a controller can easily change the encryption key such as a media encryption key (MEK) used across all the bands or storage devices in contrast to the DBE which may have a different encryption key for each storage device. The added criterion may include number of storage devices in the environment or number of storage devices that the data would be written to where the storage devices are SEDs. DBE may be preferred when the number of storage devices meets or exceeds a particular threshold offloading the encryption to the storage devices ensuring that the controller does not become a bottleneck.

The added criterion may also include topology of the environment. For example, whether the information handling system includes external disks in arrays such as a RAID or "just a bunch of disks" (JBOD). Generally, JBOD refers to a collection of hard disks that have not been configured to act as a RAID. Typically, in this scenario, CBE would be a better choice because the data is already encrypted before it goes out of the secure environment and stored externally. In this example, the administrator determined that the added criterion (specific criterion detail not shown) is very important and is assigned a weight value of ten. Because the CBE meets the added criterion, a score of one is assigned as shown in CBE 635. Because the DBE does not meet the added criterion, a score of zero is assigned as shown in DBE 645.

Total CBE 655 shows the weight values of each criterion that the CBE encryption mode met or satisfied. For each criterion, the weight value of the criterion is set in total CBE 655 where the score for CBE 635 is equal to one. In other words, for each criterion, if the score is equal to one in CBE 635, the weight value of the criterion is copied to its corresponding row in total CBE 655. For example, because the CBE meets the criterion FIPS certification as shown by the score of one in CBE 635, a total score of ten is set in total CBE 655. In addition, because the CBE does not meet the criterion cipher strength as shown by the score of zero in CBE 635, a total score of zero is set in total CBE 655. The last row of total CBE 655 shows a tally or sum of the total scores for the CBE encryption mode.

Total DBE 665 shows the weight values associated with the DBE encryption mode for each criterion. For each criterion, the weight value of the criterion is set in total DBE 665 where the score for DBE 645 is equal to one. In other words, for each criterion, if the score is equal to one in DBE 645, the weight value of the criterion is copied to its corresponding row in total DBE 665. For example, because the score for the criterion cipher strength at DBE 645 is equal to one, a total score of eight is set in total DBE 665.

In addition, because the score for the criterion multi-band support at DBE 645 is zero, a total score of zerp is set in total DBE 665. The last row of total DBE 665 shows the tally or sum of the total scores for the DBE encryption mode. Here, the sum of the total scores for the CBE is 25 which is greater than the sum of the total scores of the DBE which is 23. Accordingly, the negotiation protocol may select the CBE as the encryption mode when enabling encryption.

In this example, CBE's final total score of 25 meets or satisfies the set of criteria. However, the administrator may define a final total score that should be met to satisfy the set of criteria. For example, the administrator may determine that an encryption mode must have a sum of total scores greater than 30 to be selected. If this is a rule, then the sum of the total scores of the CBE does not satisfy the set of criteria and thus no encryption mode may be selected. The administrator may disable encryption or choose a software based encryption. In another example, the sum of the total scores of the encryption modes are equal. In this scenario, the administrator may use the combination of the encryption modes. The administrator may also select one of the encryption modes. The administrator may also add another criterion to break the tie.

FIG. 7A is an example of a table 710 that shows a general format of a proposed SCSI command: get supported encryption protocols. In a SCSI protocol, an initiator sends a SCSI command to a target device. The target device sends a response to the initiator. In this example, the initiator may be the decision engine and the target may be a controller. The command may or may not be processed as an uninterrupted sequence of actions. Typically, commands are sent in a command descriptor block (CDB) as shown in FIGS. 7A and 7B.

As shown in this example, table 710 shows the typical format of a 6-byte CDB. The CDB usually includes a one-byte operation code field such as an operation code 725 followed by command parameters or fields. In this example, the command parameters include a location 730, an enable product data (EVPD) 740, a page code 745, and an allocation length 755. The CDBs may have one or more reserved parameters such as a reserved 735 and a reserved 750. Reserved or not implemented fields of the CDB are generally ignored and padded with zeroes. The CDBs generally has a control field such as a control 760 as the last byte. The contents of the control field is defined in an SCSI architecture model.

Operation code 725 may contain a code value that identifies the command or operation being requested. In this example, operation code 725 may be set to the code value for the get supported encryption modes command. Location 730 specifies either a logical unit number, an array number, or an encryption band addressed by the command. If the specified location is inaccurate, such as the location does not exist or exceeds the capacity of the storage device, then the target device may respond with a check condition. The check condition generally occurs when the target device needs to report an error. The initiator of the command then issues a request sense command to which the target may respond with a set of sense data. The sense data contain information regarding the check condition. The sense data may include a sense key, an additional sense code, and an additional sense code qualifier. Examples of sense key values include ILLEGAL REQUEST, ABORTED COMMAND, and HARDWARE ERROR. Examples of sense code values include LOGICAL BLOCK ADDRESS OUT OF RANGE, LOGICAL UNIT FAILURE, LOGICAL UNIT ACCESS NOT AUTHORIZED, etc. EVPD 740 field may be defined and set to define a type of data to be returned with the command. For example, if EVPD 740 bit is set to zero, a standard inquiry data may be returned. Otherwise, if EVPD 740 bit is set to one, vital data that may be specified by page code 745 may be returned.

Page code 745 may specify which vital product data page or pages to return in a data-in buffer. Page code 745 field may be associated with EVPD 740. For example, page code 745 may be set to zero when EVPD 740 is set to zero. Also, page code 745 may be set to one when EVPD 740 is set to one. If page code 745 is not set to zero when EVPD 740 is set to zero, then the command may return a check condition status. The status may also include additional information. For example, the status may include a sense key ILLEGAL REQUEST and a sense code INVALID FIELD IN CDB. Allocation length 755 may specify a maximum number of bytes allocated in a data-in buffer. An allocation length of zero specifies that no data shall be transferred. The transfer may be terminated when the number of bytes specified in the allocation length 755 has been reached or when all available data has been transferred, whichever is less.

FIG. 7B is an example of a table 720 that shows a general format of proposed SCSI command: set supported encryption protocols. In this example, the initiator may be a decision engine and the target may be a controller. The proposed command may be sent to set the encryption modes at the controller. The command may or may not be processed as an uninterrupted sequence of actions. As shown in this example, table 710 shows the typical format of a 6-byte CDB. The CDB includes the following fields or parameters: an operation code 765, a location 770, a reserved 775, an EVPD 780, a page code 785, a reserved 790, an allocation length 795, and a control 797.

Operation code 765 contains the code value that identifies the command or operation being requested. In this example, operation code 765 may be set to a code value for the set supported encryption modes command. Location 770 specifies either a logical unit number, an array number, or an encryption band addressed by this command. Similar to above, the target device may respond with the check condition status to report an error. EVPD 780 may be defined and set to define a type of data to be returned with the command. For example, if EVPD 780 bit is set to zero a standard inquiry data may be returned. Otherwise, if EVPD 780 bit is set to one, vital data that is specified by page code 785 may be returned.

Page code 785 may specify which vital product data page or pages to return in the data-in buffer. Page code 785 may be associated with EVPD 780. For example, page code 785 may be set to zero when EVPD 780 is set to zero. Also, page code 785 may be set to one when EVPD 780 is set to one. If page code 785 is not set to zero when the EVPD 780 is set to zero, then the target may return a check condition status. The status may also include additional information. For example, the status may return a sense key of ILLEGAL REQUEST and a sense code of INVALID FIELD. Allocation length 795 field may specify a maximum number of bytes allocated in the data-in buffer.

An administrator may perform administration tasks directly or indirectly through an interface that is communicatively coupled to the service processor through one or more networks. Administration tasks may include providing and configuring encryption software, such as providing or defining cipher suites. Administration tasks may include setting criteria to be used during the negotiation protocol between the CBE and the DBE. In this context, "administrator" refers broadly to any system, process, individual, user, etc., that interacts with a service processor for management or administration purposes.

The description refers to a decision engine. An "engine" refers to a program instance that carries a task or tasks dispatched from another program instance that calls, instantiates, or invokes the engine. State information is maintained for the engine to return a task result to the program instance that dispatched the task. A context switch may occur between the dispatching program instance and the engine. Instead of a context switch, the dispatching program instance may maintain information to track the state of the dispatched task and continue performing other operations, such as dispatching another task to the engine or another engine.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random-access memory or other volatile re-writable memory. Additionally, the computer-readable medium can include a magneto-optical or optical medium, such as a disk or tapes or other storage devices to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

What is claimed is:

1. In a system having a storage device capable of a first encryption protocol and a controller capable of a second encryption protocol, a method comprising:
    mapping, by the controller, storage transactions to the storage device;
    determining a first total score of the first encryption protocol and a second total score of the second encryption protocol, wherein the first total score and the second total score include a score for each criterion of a plurality of criteria which include: a strength of each encryption protocol, a topology of the system, a federal information processing standard certification status, a virtualization support, a multi-key support, a multi-band support, and an enterprise key management server support;
    selecting an encryption protocol with highest total score between the first encryption protocol and the second encryption protocol based on comparing the first total score and the second total score; and
    encrypting the storage transactions using the encryption protocol.

2. The method of claim 1, wherein the first encryption protocol is implemented based on determining that the first total score is greater than the second total score.

3. The method of claim 1, wherein the each criterion is assigned a weight.

4. The method of claim 3, further comprising for the each criterion, determining whether the first encryption protocol meets the criterion and assigning the score for the criterion in response to the determining that the first encryption protocol meets the criterion.

5. The method of claim 4, wherein the score is relative to the weight assigned to the criterion.

6. The method of claim 3, further comprising for the each criterion, determining whether the first encryption protocol meets the criterion and assigning the score of zero for the criterion in response to the determining that the first encryption protocol does not meet the criterion.

7. The method of claim 1, wherein the criteria are based on predefined policies for automatic implementation of encryption protocols.

8. The method of claim 1, further comprising disabling encryption in response to determining that the first encryption protocol and the second encryption protocol do not satisfy the criteria.

9. The method of claim 1, further comprising initiating a get supported encryption protocols command to the system.

10. The method of claim 1, further comprising initiating a set supported encryption protocols command to the system.

11. The method of claim 1, wherein the criteria further includes a first migration capability of the storage device, a second migration capability of the controller, an ease of erasing data, a number of storage devices, and a number of controllers.

12. A system comprising:
    a storage device having a first encryption protocol;
    a controller having a second encryption protocol, wherein the controller is configured to map storage transactions to the storage device; and
    a processor configured to:
        determine a first total score of the first encryption protocol and a second total score of the second encryption protocol, wherein the first total score and the second total score include a score for each criterion of a plurality of criteria that include: a strength of each encryption protocol, a topology of the system, a federal information processing standard certification status, a virtualization support, a multi-key support, a multi-band support, and an enterprise key management server support;
        select an encryption protocol with highest total score between the first encryption protocol and the second encryption protocol based on comparing the first total score and the second total score; and
        encrypt the storage transactions using the encryption protocol.

13. The system of claim 12, the processor further configured to disable the first encryption protocol if the second encryption protocol is implemented.

14. The system of claim 12, the processor further configured to disable the second encryption protocol if the first encryption protocol is implemented.

15. The system of claim 12, the processor further configured to initiate a get encryption protocol command.

16. The system of claim 12, the processor further configured to initiate a set encryption protocol command.

17. A system comprising:
    a storage device capable of a first encryption protocol; and
    a controller capable of a second encryption protocol, wherein one of the first encryption protocol or the second encryption protocol with highest score is selected based on a comparison of a first total score of the first encryption protocol and a second total score of the second encryption protocol, wherein the first total score and the second total score include a score for each criterion of a plurality of criteria which include: a strength of encryption algorithm, a topology of the system, a federal information processing standard certification status, a virtualization support, a multi-key support, a multi-band support, and an enterprise key management server support, and wherein the controller is further configured to encrypt storage transactions using the selected encryption protocol.

18. The system of claim 17, wherein the criteria further includes a first migration capability of the storage device, a second migration capability of the controller, an ease of erasing data, a number of storage devices, and a number of controllers.

19. The system of claim 17, wherein the first encryption protocol is selected based on a determination that the first total score is greater than the second total score.

20. The system of claim 17, wherein the controller is further configured to disable an encryption protocol that is not selected.

* * * * *